A. M. PIGEON.
KNITTING MACHINE.
APPLICATION FILED JULY 5, 1917.
Reissued Sept. 25, 1917. 14,369.
FIG. III.
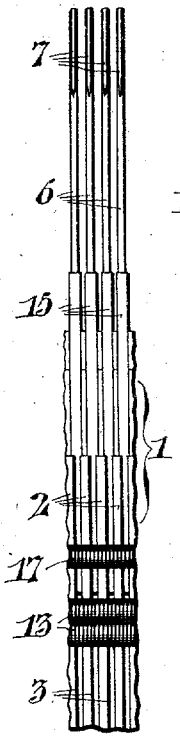
FIG. I.
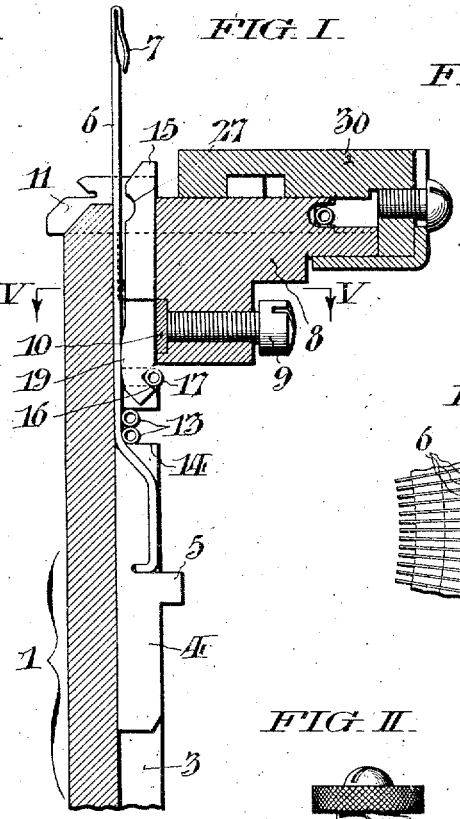
FIG. VI.
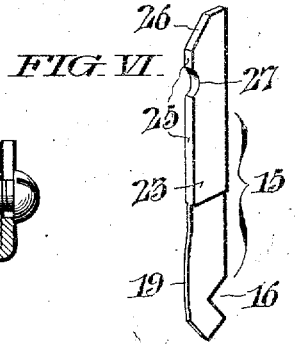
FIG. IV.
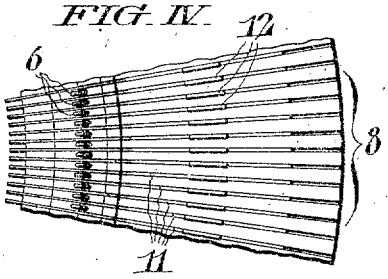
FIG. VIII.
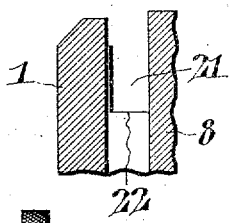
FIG. II.
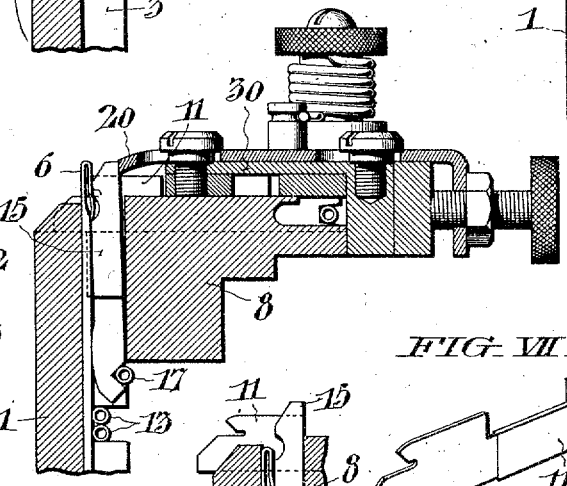
FIG. V.
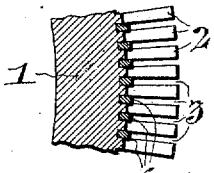
FIG. VII.
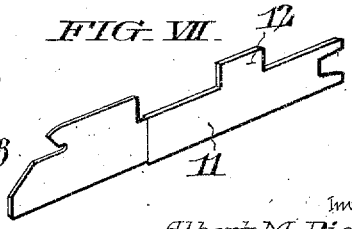
FIG. IX.
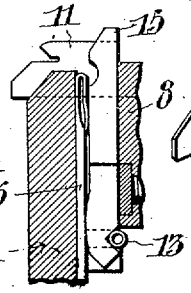
Inventor
Albert M. Pigeon,
By Philip T. Paul
Attorney.
Witnesses
John C. Wagner
James H. Bell

UNITED STATES PATENT OFFICE.

ALBERT M. PIGEON, OF NORRISTOWN, PENNSYLVANIA, ASSIGNOR TO WILDMAN MFG. CO., OF NORRISTOWN, PENNSYLVANIA, A CORPORATION OF PENNSYLVANIA.

KNITTING-MACHINE.

14,369. Specification of Reissued Letters Patent. Reissued Sept. 25, 1917.

Original No. 1,213,004, dated January 16, 1917, Serial No. 20,053, filed April 8, 1915. Application for reissue filed July 5, 1917. Serial No. 178,873.

*To all whom it may concern:*

Be it known that I, ALBERT M. PIGEON, residing at Norristown, in the county of Montgomery and State of Pennsylvania, have invented certain new and useful Improvements in Knitting-Machines, whereof the following is a specification, reference being had to the accompanying drawings.

The invention relates to knitting machines having spring beard needles, the beards of which are closed by pressing means for shedding the loops.

An object of the invention is to provide means for engaging the spring beard of the needle for preventing vibration of the beard, after the loop has been shed. In spring beard machines employing vertically movable needles the vibration referred to occurs when the needle is at or approaching the lower part of its stroke and particularly at the time when the needle is about to reverse its movement.

A further object of the invention is to provide a needle cylinder wherein the partitions between the needle grooves are cut away at their upper ends so as to prevent the beards of the needles striking the same, and so as to permit the pressers being thickened and insure their engagement with the spring beards of the needles.

In the drawings which show by way of illustration one embodiment of the invention, Figure I, is a partical vertical sectional iew through a needle cylinder and the supporting ring at the upper end thereof, showing my improved beard presser and the construction of needle groove.

Fig. II, is a view similar to Fig. I, at a point in the cylinder to show in section the cam for engaging the beard pressers.

Fig. III, is a side view of a portion of the upper end of the needle cylinder, showing the spring beard needles and the pressers which coöperate with the same in the position corresponding to that of Fig. I.

Fig. IV, is a plan view of a section of the needle cylinder, showing the spring beard needles, the pressers and the web supporters.

Fig. V, is a cross sectional view on the line V, V, of Fig. I.

Fig. VI, is a perspective view of one of my improved beard pressers.

Fig. VII, is a perspective view of one of the yarn supporters.

Fig. VIII, is a vertical sectional view through the upper part of the needle cylinder and a portion of the supporting ring, the needle and the presser being removed; and Fig. IX, is a vertical sectional view showing the needle cylinder, yarn support, spring beard needle and presser with the needle at the lower end of its reciprocation.

In the preferred embodiment for a circular knitting machine as herein shown and described, the invention consists generally in providing the needle grooves with spring beard needles and beard pressers, which beard pressers are so constructed as to engage the beards of the needles, both for the purpose of pressing the beards to cast off the loops, and also to prevent vibration of the spring beards, during the lower portions of their stroke and particularly when the needles are reversing their direction of movement, which is likely to result in the crystallization of the metal forming the spring beard, thereby rendering them fragile and subject to fracture.

The portions between the grooves of the needle cylinder are cut away at the upper ends so that the beard presser may be thickened and thus form a widened surface which engages the spring beard of the needle and this widened surface insures that the spring beard will always be engaged though the same may be sprung slightly laterally. The cutting away of the partitions forming the needle grooves at the upper end of the needle cylinder insures that the spring beard of the needle when the needle is lowered will not strike the rib even though the spring beard be slightly bent out of normal position.

Referring more in detail to the drawings, I have shown a needle cylinder 1, which is of the usual construction and is provided with spaced partitions 2, forming needle grooves 3. Mounted in the grooves 3, are needle jacks 4, which are provided with butts 5. Each jack carries a needle 6, which is provided with a spring beard 7. The needles are detachably connected to the jacks and are reciprocated vertically in the needle grooves by suitable cams which engage the butts on the needle jacks.

At the upper end of the needle cylinder is a supporting ring 8, which is clamped to the needle cylinder by suitable set screws 9, which are adapted to bear against a clamping ring 10. Mounted in suitable grooves in the ring 8, are yarn supporters 11, which are also provided with butts 12, adapted to be engaged by suitable cams for moving the same radially of the needle cylinder. These yarn supporters are of the usual construction. The needles and jacks are held in the needle cylinder by suitable elastic bands 13, which are located in the circumferential groove 14, formed in the needle cylinder. Located in each needle groove is a beard presser 15. This beard presser 15, is provided with a suitable notch 16, at its lower end, and an elastic band 17, also located in a circumferential groove in the cylinder, engages the notches 16, in the beard pressers and holds the same detachably in the needle grooves. That is to say, the lower end of the beard presser is tapered at 18, while the lower face of the notch 16, is likewise tapered but in an opposite direction, and this permits a beard presser to be withdrawn by force applied to the upper end thereof or inserted in a like manner at will. The lower end of the beard presser is formed with a slightly rounded projection 19, which bears against the needle and serves as a fulcrum point for the presser. The pressers are slightly oscillated about this rounded projection by suitable cams 20, which are carried by the supporting ring 8. These cams may be adjustably and yieldingly mounted if desired. They are of the usual construction and further description is not thought necessary.

The partitions forming the needle grooves are cut away at 21, and from the level 22, to the upper end of the cylinder and substantially to the full depth of the needle channel leaving only a projecting rib which is of substantially the diameter of the shank of the needle.

The upper portion of the beard presser is thickened as at 23, Fig. VI. This thickening of the presser affords a substantially broad engaging surface 25. The top of the beard presser is provided with a cam incline 26, and said beard presser is formed with a notch 27. This notch 27, is so positioned relative to the upper edge of the needle cylinder and the web supporters, as to provide a clearance space, whereby a previously formed loop may be shed over the top of the needle during the formation of a stitch The broadened surface 25, is so shaped and proportioned that when the needle beard has passed the notch 27, it will engage said surface and remain in engagement with said surface during the remainder of the downward stroke of the needle and during the first part of the upward or return stroke of the needle and regardless of whether the cams 20, are in engagement with the beard pressers or not. This insures that the spring beard will be under tension during the lower portion of its stroke and particularly at the time when the motion of the needle is abruptly reversed. By cutting away the partition 2, of the needle cylinder at the upper end thereof, I am not only able to increase the width of the beard engaging surface 25, on the presser for the needle, but I also insure that the beard of the needle will not strike the ribs on the needle cylinder, if said beard is slightly bent laterally or displaced.

I have found that when the beards of the needles are free to vibrate after the shedding of the loops, and particularly during the abrupt reversal of the movement at the lowermost point in the needle wave, such vibration ultimately results in the crystallization of the needle beards and thereby renders them very weak, thus causing excessive breakage. In fine gage it is essential to bring the needles down through the fabric at as steep an angle as possible in drawing the new loops and also in backing them up to the idle level and this greatly increases the vibration above referred to. By my improved form of beard presser where the spring beard is under tension at this critical time, I am able to eliminate all this vibration and thus prevent crystallization which would otherwise result.

It is to be understood that changes in the details of construction and arrangement of the parts may be made without departing from the spirit of the invention as set forth in the appended claims.

Having thus described my invention, I claim:

1. In a knitting machine, the combination of a needle carrier; spring beard needles mounted therein; means for closing the needle beards to permit the shedding of the loops; and means for engaging the beards, whereby vibration thereof, after the shedding of the loops, is prevented.

2. In a knitting machine, the combination of a needle carrier; spring beard needles mounted therein; means for moving said needles longitudinally; means for closing the beards of said needles to permit the shedding of the yarn loops over the same; and means for engaging the beards of the needles when said needles are approaching the end of their receding movement; whereby vibration of the needle beards, after the shedding of the loops, is prevented.

3. In a knitting machine, the combination of a needle cylinder; a series of spring beard needles carried thereby; means for closing the needle beards to permit the shedding of the loops; and means for engaging the needle beards, whereby vibration thereof, after the shedding of the loops, is prevented.

4. In a knitting machine, the combination of a needle cylinder; a series of spring beard needles carried thereby, and means for engaging the beards of the needles for closing said needle beards for shedding the yarn loops over the same and for engaging the beards of the needles when said needles are at the lower end of their stroke for preventing vibration of the needle beards upon reversal of the movement of the needles.

5. In a knitting machine, the combination of a needle cylinder; a series of spring beard needles carried thereby; a beard presser for each needle mounted on the needle cylinder and having means for engaging and closing the beard of the needle for shedding the yarn loops over the same, and means for engaging the needle beard when the needle is at the lower end of its reciprocation for preventing vibration of said needle beard upon the reversal of the movement of the needle.

6. In a knitting machine, the combination of a needle cylinder; a series of spring beard needles carried thereby; a beard presser for each needle mounted on the needle cylinder; means for engaging said beard pressers for causing said pressers to close the beards for shedding the yarn loops over the same, and said pressers having means for engaging the needle beards when the needles are at the lower end of their reciprocation for preventing vibration of said needle beards upon the reversal of the movement of the needles.

7. In a knitting machine, the combination of a needle cylinder having needle grooves therein; a series of spring beard needles located in said grooves; a beard presser for each needle located in each needle groove, cams for engaging the upper ends of said beard pressers for swinging the same to close the beards of the needles to permit the yarn loops to pass over the same, said beard pressers having means for engaging the spring beards and placing the same under tension while the needles are at the lower end of their stroke.

8. In a knitting machine, the combination of a needle cylinder having a series of spaced partitions forming needle grooves, spring beard needles located in said grooves, said partitions being cut away at the upper ends thereof to a point below the lowest extreme position of the needle beards during the reciprocation of the needles, a beard presser for each needle located between the partitions on the cylinder, said beard pressers being thickened above the ends of the cut away partitions, so as to provide a wide bearing surface for engaging the beard of the needle.

9. In a knitting machine, the combination of a needle cylinder having a series of spaced partitions forming needle grooves; spring beard needles located in said grooves, said partitions being cut away at the upper ends thereof to a point below the lowest extreme position of the needle beards during the reciprocation of the needles, a beard presser for each needle located in the groove between the partitions and extending above the cut away ends of the partitions, said beard presser being thickened above said ends of the partitions to provide a wide bearing surface for the beard of the needle, and said pressers being constructed so as to engage the beards of the needles while the needles are at the lower ends of their stroke for preventing the beards from vibrating.

10. In a knitting machine, the combination of a needle cylinder having a series of spaced partitions forming needle grooves, said partitions being cut away at their upper ends, a series of spring beard needles mounted in said grooves, a beard presser for each needle mounted in the needle groove, and extending above the needle cylinder, said beard presser having a cam surface at its upper end and thickened to form a wide surface for engaging the beard of the needle for closing the same to shed the yarn loop, and a cut away portion beneath said widened portion, providing a clearance space for said loop.

11. In a knitting machine, the combination of a needle cylinder having a series of spaced partitions forming needle grooves, said partitions being cut away at their upper ends, a series of spring beard needles mounted in said grooves, a beard presser for each needle mounted in the needle groove, and extending above the needle cylinder, said beard presser having a cam surface at its upper end and thickened to form a wide surface for engaging the beard of the needle for closing the same to shed the yarn loop, and a cut away portion beneath said widened portion for forming a clearance space for said loop, each beard presser being thickened beneath said cut away portion and constructed so as to form a wide surface for engaging the spring beard of the needle while said needle is at the lower end of its stroke and reversing its movement.

12. In a knitting machine, the combination of a needle cylinder having a series of grooves formed therein, a spring beard needle for each groove, a beard presser for each needle located in the needle groove, said beard presser having a rounded lower end adapted to engage the needle, a tapered upper end, a notch beneath said tapered upper end, and a widened surface below said notch adapted to engage the beard of the needle when said needle is at the lower end of its stroke.

In testimony whereof, I have hereunto signed my name at Norristown, Penna., this 30th day of June, 1917.

ALBERT M. PIGEON.

Witnesses:

E. R. Roberts,

Owen Ballard.